(12) United States Patent
Wiggins et al.

(10) Patent No.: US 11,984,752 B2
(45) Date of Patent: May 14, 2024

(54) ACTUATING MECHANISM WITH INTEGRAL BATTERY

(71) Applicant: ROTORK CONTROLS LIMITED, Bath (GB)

(72) Inventors: Jonathan Wiggins, Bath (GB); David Ware, Bath (GB); Nian You Tan, Bath (GB)

(73) Assignee: ROTORK CONTROLS LIMITED, Bath (GB)

( * ) Notice: Subject to any disclaimer, the term of this patent is extended or adjusted under 35 U.S.C. 154(b) by 268 days.

(21) Appl. No.: 17/609,509

(22) PCT Filed: May 1, 2020

(86) PCT No.: PCT/GB2020/051085
§ 371 (c)(1),
(2) Date: Nov. 8, 2021

(87) PCT Pub. No.: WO2020/225543
PCT Pub. Date: Nov. 12, 2020

(65) Prior Publication Data
US 2022/0231531 A1 Jul. 21, 2022

(30) Foreign Application Priority Data

May 7, 2019 (GB) .................................... 1906423
Mar. 10, 2020 (GB) .................................... 2003472

(51) Int. Cl.
*H02J 7/00* (2006.01)
*F16K 31/04* (2006.01)
(Continued)

(52) U.S. Cl.
CPC ..... *H02J 7/007194* (2020.01); *H01M 10/425* (2013.01); *H01M 10/443* (2013.01);
(Continued)

(58) Field of Classification Search
CPC .. H02J 7/0068; H02J 7/0031; H02J 7/007192; H02J 7/00309; H02J 7/0048;
(Continued)

(56) References Cited

U.S. PATENT DOCUMENTS 6,257,549 B1 * 7/2001 Hopper ..................... H02J 9/06
251/129.11
2011/0012562 A1 * 1/2011 Paryani ............. H02J 7/007192
320/152

(Continued)

FOREIGN PATENT DOCUMENTS

CN 109036886 A 12/2018
EP 652621 A2 5/1995
(Continued)

*Primary Examiner* — Said Bouziane
(74) *Attorney, Agent, or Firm* — Dickinson Wright PLLC; Andrew D. Dorisio

(57) ABSTRACT

A motor driven actuator device includes an actuator motor; a controller; an input for receiving an external power supply; and a battery pack electrically connected to selectively drive the actuator motor, and electrically connectable to the external power supply for charging. During charging of the battery pack, the controller is configured to compare a measured charge level with a pre-determined charge level required to complete at least two battery shutdown events under battery power alone. During subsequent actuator device operation, the controller is configured to: determine if the external power supply is invalid, instruct a battery shutdown event causing the battery to be discharged, with enough charge in the battery to complete at least one further battery shutdown event; and, subsequently detect when the external power supply becomes valid, and resume actuator device operation under the external power supply, while simultaneously recharging the battery pack to at least the pre-determined charge level.

23 Claims, 4 Drawing Sheets

(51) Int. Cl.
*H01M 10/42* (2006.01)
*H01M 10/44* (2006.01)
*H01M 10/48* (2006.01)
*H02P 29/60* (2016.01)

(52) U.S. Cl.
CPC ......... *H01M 10/48* (2013.01); *H01M 10/486* (2013.01); *H01M 10/488* (2013.01); *H02J 7/00036* (2020.01); *H02J 7/00045* (2020.01); *H02J 7/00309* (2020.01); *H02J 7/0048* (2020.01); *H02J 7/0063* (2013.01); *H02J 7/0068* (2013.01); *H02P 29/60* (2016.02); *F16K 31/04* (2013.01); *H01M 2010/4271* (2013.01)

(58) Field of Classification Search
CPC ............. H02J 7/00036; H02J 7/007194; H02J 7/0063; H02J 7/00045; H02P 29/60; H02P 29/02; H02P 3/025; H01M 10/44; H01M 10/425; H01M 10/486; H01M 10/443; H01M 10/488; H01M 10/48; H01M 2010/4271; F16K 31/04
See application file for complete search history.

(56) References Cited

U.S. PATENT DOCUMENTS

| | | |
|---|---|---|
| 2015/0330116 A1 | 11/2015 | Dente |
| 2018/0218796 A1 | 8/2018 | Kwon et al. |
| 2019/0036373 A1* | 1/2019 | Shimura ........... H01M 10/0525 |
| 2019/0346895 A1* | 11/2019 | Ho ..................... H05K 7/20381 |

FOREIGN PATENT DOCUMENTS

| | | |
|---|---|---|
| EP | 739048 A1 | 10/1996 |
| GB | 2568103 A | 5/2019 |
| GB | 2568104 A | 5/2019 |
| JP | 2017053490 A | 3/2017 |
| RU | 2627243 C1 | 8/2017 |
| WO | 2020225543 A1 | 11/2020 |

* cited by examiner

ACTUATING MECHANISM WITH INTEGRAL BATTERY

FIELD OF THE INVENTION

This invention relates generally to a motor-driven actuator device, such as a valve actuator, including an integral battery.

BACKGROUND OF THE INVENTION

The power source applied to a motor-driven actuating mechanism, such as a valve actuator, is usually provided by an AC mains supply. However, it is known to provide a (often external) battery backup in such actuators to provide valve failsafe operation by utilising power from a battery source during AC supply mains failure. Thus, in such actuators, under normal supply conditions, the actuator operates from the site AC electrical supply. However, in the event that this supply is lost, the actuator automatically switches over to receive power from a battery supply, allowing control of the valve to a (often externally) pre-configured (failsafe) position.

Such batteries however normally take quite some time, such as tens of minutes or hours, to recharge, and during this time actuator operation will typically be prevented. This downtime will often lead to significant production and financial losses.

One solution is to provide means to quickly re-charge the battery after a battery powered operation, to minimise the amount of downtime. However, this comes at the expense of a shorter battery life. There are also significant limitations on the useable temperature range of the battery, thus limiting the environments in which the actuator comprising the battery can be used.

It is an object of embodiments of the present invention to address at least some of these issues.

SUMMARY OF THE INVENTION

In accordance with a first aspect of the present invention, there is provided a motor driven actuator device comprising:
  an actuator motor;
  a control module;
  an input for receiving an external power supply; and,
  a battery pack electrically connected to selectively drive the actuator motor, and being electrically connectable to the external power supply for charging;
  wherein, during charging of the battery pack, the control module is configured to:
    receive data representative of the measured charge level of the battery pack;
    compare the measured charge level with a pre-determined charge level required to complete at least two battery shutdown events under battery power alone, wherein a battery shutdown event involves moving the actuator device to a failsafe position; and,
    if the measured charge level is equal to or greater than the pre-determined charge level, indicate the battery status to other components associated with the actuator device; and,
  wherein, during subsequent actuator device operation, the control module is configured to:
    detect and determine the validity of the external power supply, and if the external power supply is determined to be invalid, instruct a battery shutdown event causing the battery to be discharged, such that there will still be enough charge in the battery to complete at least one further battery shutdown event; and,
    subsequently detect when the external power supply becomes valid, and resume actuator device operation under the external power supply, whilst simultaneously recharging the battery pack to at least the pre-determined charge level.

A valid external power source is one which is present, and equal to or above a pre-defined power level required to drive the actuator motor, run any peripheral functions of the actuator device, and charge the battery pack (if required). An invalid external power supply is one which is not present, or below the pre-defined power level.

The battery shutdown event can involve causing the actuator device to be moved to a failsafe position under battery power alone. The actuator device can be moved to the failsafe position by driving the actuator motor towards the failsafe position under battery power alone.

The pre-determined charge level can be sufficient to complete three, or four, or more, battery shutdown events under battery power alone.

One or more of: the actuator motor, the control module, and the battery pack can be located within an actuator housing. The actuator housing can define one or more enclosures.

The actuator device can further comprise a drive configured to couple the actuator motor to an external device to be actuated. The drive can be located within the actuator housing. The drive can comprise a shaft, and can be configured to couple the actuator device to the external device via the shaft. The shaft can be driven by the actuator motor through gearing. The actuator motor can be a reversible electric motor. The external device can be a valve. The external device can be a damper.

In embodiments, the control module can be configured to prevent actuator device operation if the measured charge level is less than a second pre-determined charge level required to complete a single battery shutdown event.

The data representative of the measured battery charge level can include voltage and/or coulomb count measurements.

The control module can be further configured to:
  receive data representative of a status of the external power supply;
  receive data representative of a charge state and/or status of the battery pack; and,
  cause the battery pack to be charged from the external power supply when the external power supply is determined to be valid and present and the battery pack requires charging.

The actuator device can further comprise at least one temperature sensing device associated with the battery pack.

The control module can be further configured, during charging of the battery pack, to:
  receive from the at least one temperature sensing device, data representative of a measured temperature associated with the battery pack;
  compare the measured temperature with a first predetermined threshold temperature; and,
  if the measured temperature is greater than the first predetermined threshold temperature, cause a charging current delivered from the external power supply to the battery pack to be reduced to prolong the life of the battery pack.

If the measured temperature is greater than the first predetermined temperature, the control module can be configured to cause a charging current delivered from the external power supply to the battery pack to be reduced until the measured temperature is at or below the first predetermined threshold temperature.

The battery pack can comprise a plurality of secondary lithium/nickel metal hydride/nickel cadmium cells arranged and configured for use in Explosionproof environments.

The actuator device can further comprise a balanced charging circuit and a circuit configured to provide over voltage, over current and under voltage protection in respect of the battery cells, as compared to the normal/intended levels of voltage and current.

The actuator device can further comprise at least one heating device associated with the battery pack. The control module can be further configured, during charging of the battery pack, to:
- compare the measured temperature with a second predetermined threshold temperature; and,
- if the measured temperature is less than the second predetermined threshold temperature, cause the at least one heating device to be switched on until the measured temperature is at or above the second predetermined threshold temperature.

The control module can be further configured to delay the simultaneous recharging of the battery pack until the temperature of the battery pack is between the first and second pre-determined threshold temperatures.

The external power supply can be a renewable and/or harvested energy source.

The actuator device can further comprise ancillary systems. The ancillary systems can comprise sensors and/or transducers connected by wired or wireless communication means to a remote location for monitoring process conditions in respect of the actuator device, and reporting data representative thereof. The communication means can be enabled only in the event that data is required to be transmitted to or from the remote location.

The external power supply can be configured to run the ancillary systems of the actuator device.

The external power supply can charge the battery pack, and the battery pack can be configured to run the ancillary systems and to selectively drive the actuator motor.

The actuator device can further comprise an integral control module configured to:
- control the selective driving of the actuator motor according to a defined control process; and,
- receive, from a remote location, data configured to update and/or alter the control process.

The control module can be configured to communicate a battery pack charge level, battery pack status and/or faults to a user. The battery pack charge level, battery pack status and/or faults (collectively referred to here as "data") can be indicated to a user on a local display, such as via an actuator display screen. The local display can optionally provide a visual indication of the data. Alternatively or additionally, the data can be conveyed in a digital form to a remote location for monitoring, such as by a control system. The digital data can be conveyed remotely via a network (wired and/or wireless). Alternatively or additionally, the data can be conveyed remotely via discrete signals, such as by a relay. The data can be in the form of a data log.

The control module can be configurable to operate in a plurality of modes, events and actions of operation in addition to a battery shutdown event. The plurality of modes, events and actions of operation can include mains and battery shutdown modes, mains and battery actuation modes, and a self contained mode; and mains and battery shutdown events, mains and battery actuation events, and self-contained events. The control module can be configured to prevent actuator device operation should the control module determine a fault condition in the battery pack and/or determine that the charge level of the battery pack is below that able to allow a shutdown event.

Mains actuation and shutdown modes are typically referred to as normal modes of operation. Mains actuation and shutdown events are typically referred to as normal events of operation.

In the shutdown modes, the control module can be configured to move the actuator device to a failsafe position, including to any other mid position and/or any other limit of movement. The battery shutdown event can involve causing the actuator device to be moved to a failsafe position under battery power alone. The mains shutdown event can involve causing the actuator device to be moved to a failsafe position under mains power alone.

In the actuation modes, the control module can be configured to cause the external power supply to operate any ancillary systems of the actuator device, including causing the battery pack to be charged by the external power supply until it receives a move command. In response to the move command, the control module can cause the actuator device to be moved under power from the battery pack alone, in the form of a battery actuation event, thus causing the battery pack to be discharged. Mains actuation events can occur when the control module causes the actuator device to be moved under power from the external power supply alone.

In the self-contained mode, the actuator device can be powered using an inconsistent power supply derived from, for example, solar panels or wind generators. Power from these sources can be fed directly into the actuator device, and can be used instead of a mains power supply in applications where an adequate mains power supply cannot be provided. A self-contained event can occur when the control module causes the actuator device to be moved under power from the self-contained power supply alone.

In accordance with a second aspect of the present invention, there is provided a battery management system for a motor-driven actuator device comprising:
- a battery management module;
- an actuator motor;
- an input for receiving an external power supply; and,
- a battery pack electrically connected to selectively drive the actuator motor, and being electrically connectable to the external power supply for charging;

wherein, during charging of the battery pack, the battery management module is configured to:
- receive data representative of the measured charge level of the battery pack;
- compare the measured charge level with a pre-determined charge level required to complete at least two battery shutdown events under battery power alone, wherein a battery shutdown event involves moving the actuator device to a failsafe position; and,
- when the measured charge level is equal to or greater than the pre-determined charge level, indicate the battery status to other internal components associated with the actuator device; and, wherein, during subsequent actuator device operation, the battery management module is configured to:
- detect and determine the validity of the external power supply, and if the external power supply is determined to be invalid, instruct a battery shutdown event causing the battery to be discharged, such that there will still be enough charge in the battery to complete at least one further battery shutdown event; and, subsequently detect when the external power supply becomes valid, and resume actuator device operation under the external power supply, whilst simultaneously recharging the battery pack to at least the pre-determined charge level.

A valid external power source is one which is present, and equal to or above a pre-defined power level required to drive the motor, run any peripheral functions of the actuator device, and charge the battery pack (if required). An invalid external power supply is one which is not present, or below the pre-defined power level.

The battery shutdown event can involve causing the actuator device to be moved to a failsafe position under battery power alone. The actuator device can be moved to the failsafe position by driving the actuator motor towards the failsafe position under battery power alone.

The pre-determined charge level can be sufficient to complete three, or four, or more, battery shutdown events under battery power alone.

The actuator motor and/or the battery pack can be located within an actuator housing. The actuator housing can define one or more enclosures.

The actuator device can further comprise a drive configured to couple the actuator motor to an external device to be actuated. The drive can be located within the actuator housing. The drive can comprise a shaft, and can be configured to couple the actuator device to the external device via the shaft. The shaft can be driven by the actuator motor through gearing. The actuator motor can be a reversible electric motor. The external device can be a valve. The external device can be a damper.

In embodiments, the battery management module can be configured to prevent actuator device operation if the measured charge level is less than a second pre-determined charge level required to complete a single battery shutdown event.

The data representative of the measured battery charge level can include voltage and/or coulomb count measurements.

The battery management module can be further configured to:
  receive data representative of a status of the external power supply;
  receive data representative of a charge state and/or status of the battery pack; and,
  cause the battery pack to be charged from the external power supply when an external power supply is determined to be valid, present and the battery pack requires charging.

The actuator device can further comprise at least one temperature sensing device associated with the battery pack.

The battery management module can be further configured, during charging of the battery pack, to:
  receive from the at least one temperature sensing device, data representative of a measured temperature associated with the battery pack;
  compare the measured temperature with a first predetermined threshold temperature; and,
  if the measured temperature is greater than the first predetermined threshold temperature, cause a charging current delivered from the external power supply to the battery pack to be reduced to prolong the life of the battery pack.

The battery management module can be configurable to operate in a selected one of a plurality of modes, events and actions of operation, in addition to a battery shutdown event. The plurality of modes, events and actions can include mains and battery shutdown modes, mains and battery actuation modes, and a self contained mode; and mains and battery shutdown events, battery actuation events, and self-contained events. The battery management module can be configured to prevent actuator device operation should the battery management module determine a fault condition in the battery pack and/or determine that the charge level of the battery pack is below that able to allow a shutdown event.

Mains actuation and shutdown modes are typically referred to as normal modes of operation. Mains actuation and shutdown events are typically referred to as normal events of operation.

The shutdown modes can be selectively configured to move the actuator device to a failsafe position, including to any other mid position or any other limit of movement. The battery shutdown event can involve causing the actuator device to be moved to a failsafe position under battery power alone. The mains shutdown event can involve causing the actuator device to be moved to a failsafe position under mains power alone.

In the actuation modes, the battery management module can be configured to cause the external power supply to operate any ancillary systems of the actuator device, including causing the battery pack to be charged by the external power supply until it receives a move command. In response to the move command, the battery management module can cause the actuator device to be moved under power from the battery pack, in the form of a battery actuation event, thus causing the battery pack to be discharged. A mains actuation event can occur when the battery management module causes the actuator device to be moved under power from the external power supply alone.

In the self-contained mode, the actuator device can be powered using an inconsistent power supply derived from, for example, solar panels or wind generators. Power from these sources can be fed directly into the actuator device, and can be used instead of a mains power supply in applications where an adequate mains power supply cannot be provided. A self-contained event can occur when the battery management module causes the actuator device to be moved under power from the self-contained power supply alone.

During charging of the battery pack, the battery management module can be configured to receive data representative of a measured life and cell impedance of the battery pack, compare the data with a predetermined profile of performance, and if the measured cell impedance is greater than the predetermined profile, cause the charge voltage thereto to be reduced.

During discharge of the battery pack, the battery management module can be configured to receive data representative of a measured temperature associated with the battery pack, compare the measured temperature with a predetermined threshold temperature and, if the measured temperature is less than the predetermined threshold temperature, cause the discharge lower voltage limit to be reduced.

During discharge of the battery pack, the battery management module can be further configured to receive data representative of a measured temperature associated with the battery pack, compare the measured temperature with a predetermined second threshold temperature and, if the measured temperature is less than the predetermined temperature, cause a heating device associated with a the battery pack to be switched on.

The battery management module can be further configured to delay the simultaneous recharging of the battery pack until the temperature of the battery pack is between the first and second pre-determined threshold temperatures.

The battery management module can be configured to detect and determine the validity of the external power supply and:
 (i) if the external power supply is valid and a valid shutdown command has been received, cause an external power supply powered shutdown event to be effected; and,
 (ii) if the external power supply is not valid or determined to become invalid, and/or a valid shutdown command has been received and/or a mains shutdown event is underway, switch from the external power supply powered shutdown event to a battery shutdown event causing the battery to be discharged, such that there will still be enough charge in the battery to complete at least one further battery shutdown event.

The battery management module can be configured to enable a motor-driven actuator device to operate normally, with the battery pack in either an idle or charge state unless the external power supply is determined to be invalid and/or a valid shutdown command is received, such that an external power supply powered shutdown event or a battery shutdown event is effected accordingly.

The battery management module can be further configured to:
 check the status of the battery pack for any one or more of the following parameters: cell status, rate of degradation and/or service/maintenance requirements;
 generate data representative of the one or more parameters; and,
 report the data:
  on a local display (such as via an actuator display screen), which optionally provides a visual indication of the data; and/or,
  to a remote location for monitoring (such as by a control system) via a network (wired and/or wireless) and/or via discrete signals (such as by a relay).
The data can be in the form of a data log.

BRIEF DESCRIPTION OF THE DRAWINGS

Embodiments of the present invention will now be described, by way of examples only, and with reference to the accompanying drawings, in which.

DETAILED DESCRIPTION

Embodiments of the present invention are particularly concerned with valve and damper actuators in, for example, the power generation industries, oil and gas flow control, marine applications, water utilities and processing industries. Such valve actuators generally have an output shaft driven by a reversible electric motor through gearing, such as worm and wheel gearing, and which can move the output shaft in either direction to open or close a valve connected via a valve stem to the output shaft.

Figure 1:
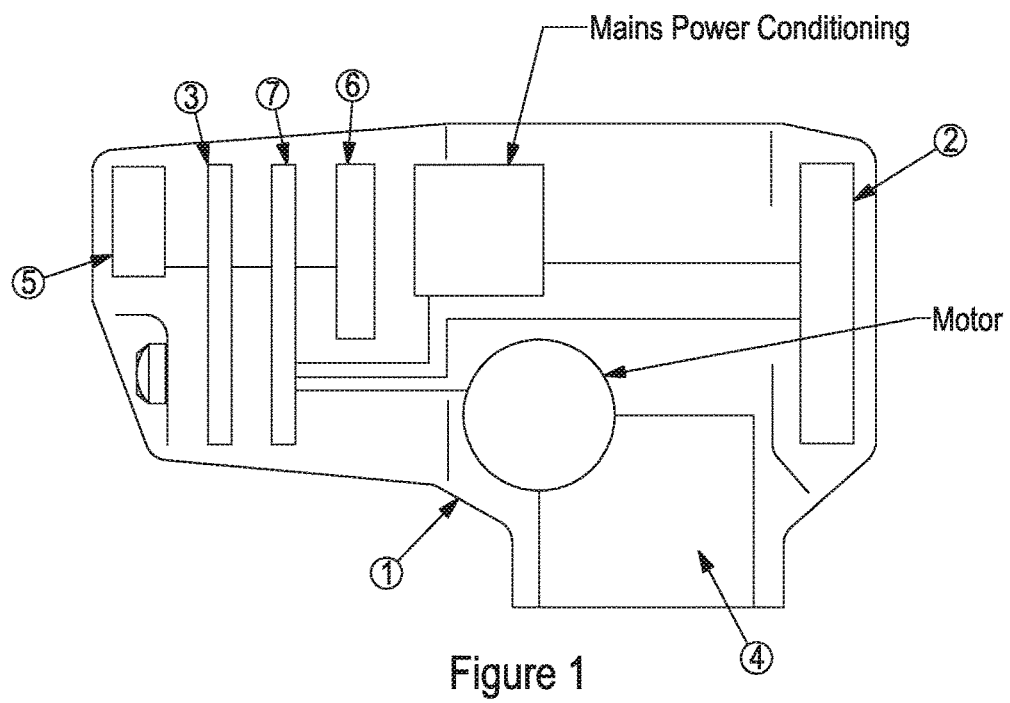
FIG. 1 is a schematic diagram illustrating a valve actuator.

FIG. 1 shows a valve actuator, comprising a main enclosure 1 and a terminal enclosure 2. The enclosures are hermetically sealed to maintain watertight integrity, and to protect the internal components. The main enclosure houses control modules 3, such as a position control device and load sensor, as well as the drive train 4. A display and local controls 5 can be housed within a cover on the main enclosure.

A battery pack 6 is mounted within the main enclosure and electrically connected to the actuator. The actuator further comprises a battery control module 7 for management of the battery pack, and operation of the actuating mechanism. The battery pack comprises a plurality of cells, such as Secondary Lithium cells, which are typically wired in series with diode protection between the cells.

The precise number of cells used, and the wiring configuration utilized, will be dependent, to some extent at least, on the capacity and power to be achieved, and also on the space available to house the resultant battery pack. Secondary Lithium cells can be used in a valve actuator of the type described above because they are suitable for use in Explosionproof (EP) devices. However, other suitable cell types, such as nickel-metal hydride or nickel-cadmium, can be used instead.

In a battery pack of the type described above, a smart balancing charge circuit is provided to protect the battery cells from being over-charged, over-discharged or becoming too discharged (also known as over voltage, over current and under voltage protection respectively). Secondary battery cells have a limited optimum temperature range, and additional circuitry is provided to protect against over-temperature, together with thermal vents in the cell housing.

Figure 2:
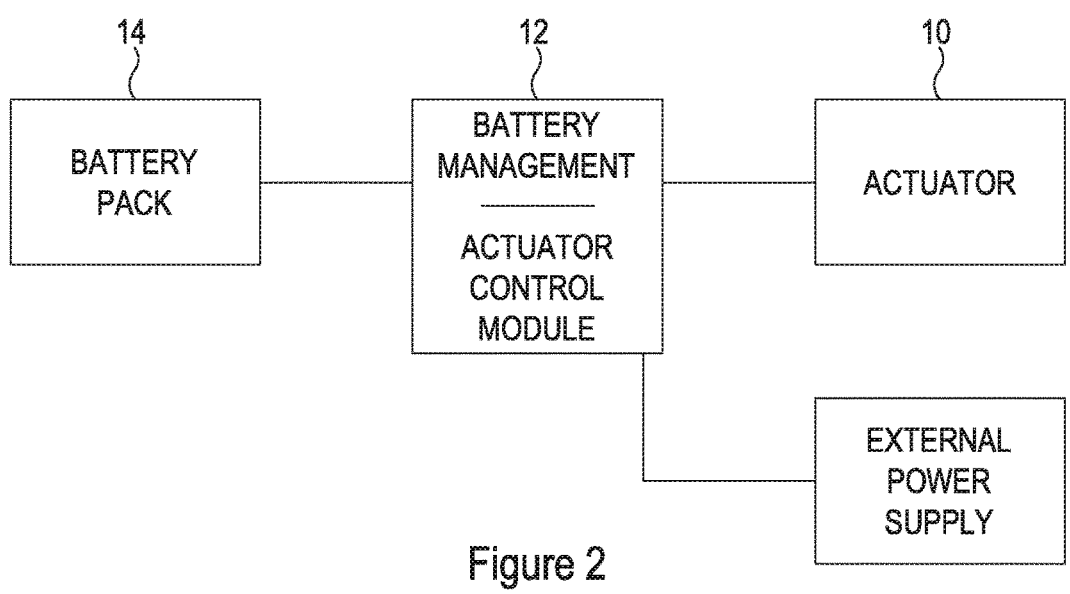
FIG. 2 is a schematic block diagram illustrating the configuration of an actuator, battery pack and actuator control module of a valve actuator; and,
 FIG. 3 is a schematic flow diagram illustrating a method of battery management.

FIG. 2 shows a configuration of an actuator 10, control module 12 and battery pack 14. The control module 12 can incorporate the above-referenced balanced charging and over voltage, over current and under voltage protection functionalities, although this is not essential, and these functions can instead be provided in a separate module/PCB. In the description that follows, the principal features of the battery management function of an actuator control module will be described. Although the above-referenced principal features are all described as being part of the same actuator control module, the actuator control module functionality may instead be provided in modular form, with one or more of the functions being provided in separate devices/PCBs, and/or remote from other functions.

Embodiments of the valve actuator, and particularly the battery pack used therein, have three modes of operation referred to herein as: shutdown, battery actuation, and self-contained; as well as five actions of operation: normal, mains shutdown, battery shutdown, battery actuation and self contained; and several resulting action types, each of which are underpinned by the integration of a battery pack of the type described above within a valve actuator and coupled thereto via a battery management function provided as part of an actuator control module. In embodiments of the invention, all of the above-mentioned modes can be accomplished using the same hardware, using different respective (switchable) configurations. Additional hardware may be used for the self-contained mode of operation to transform typically solar energy to electrical energy.

The following is a description of the battery management system within the shutdown mode with normal, mains shutdown and battery shutdown events of operation, and command and power loss actions. However, many aspects relate to all modes, events and actions of operation.

The control module, and associated battery management process flow, provides (in respect of the battery pack) active voltage and current management, diagnostics (located within the valve actuator), status feedback functionality, low temperature management (using heaters to assist performance and maintain the battery cells within their optimum operating temperature range), and high temperature management to extend the operating lifespan of the battery cells. In this exemplary embodiment, the valve actuator (and associated battery pack and control module) would be suitable for use in EP and non-EP environments in temperature ranges from −50° to 70° C.

The battery pack is interrogated by the battery management (or actuator control) module to determine battery temperature, battery capacity, battery voltage and level of charge remaining within the battery pack/cells. The present invention is not limited in terms of the manner in which these parameters are determined. The principal utility and advantage of the control module according to this embodiment, is that it uses these sensed/calculated parameters to manage the battery pack, make decisions and take the best actions for the user and/or the battery pack based on these parameters. It can also report a battery pack fault based on these parameters within a technical field where this level of battery management has not previously been possible.

One of the principal benefits, is that it has not previously been practical to use a battery pack in a valve or damper actuator that complies with EP regulations outside of specific cases. Whereas Secondary Lithium and similar battery cell technologies are able to be utilised in EP (and other) hazardous environment applications, their optimum operating temperature range is limited and they require careful management (especially when charging and discharging). Thus, embodiments of the present invention attempts to address these issues. Protection for over temperature is provided, both via electronic means and using thermal vents in the cell housing. The battery pack additionally uses heaters when the ambient temperature drops below a predefined (and configurable) point set by the actuator control module. These measures can therefore be utilised to maintain the battery cells at an optimum working temperature for both charging and discharging, and can be selectively switched on and off by the actuator control module when required. At high temperatures, the actuator control module can take the decision as to when to charge the battery pack and the rate at which to charge the battery pack, thereby facilitating extended operating temperature ranges and extending the battery pack life.

Furthermore, over the life of the valve actuator, the battery pack will, inevitably, degrade. The available battery capacity is particularly degraded at temperatures below 0° C., and at the end of the life of the battery. The actuator control module may have an inbuilt map of such degradation and, combined with battery capacity sensing, the actuator control module can vary the charge level and voltage to maximise the battery life and performance at different stages in its lifespan. Additionally, there may be an inbuilt map of the battery capacity with temperature which can be used to allow the control module to compensate for differing temperature conditions.

An actuator control module (incorporating a battery management function) can be communicably coupled to an integral battery and configured to monitor and control the battery operation according to a mode of operation and a plurality of associated respective parameters, as will be described in more detail hereinafter.

Figure 3:
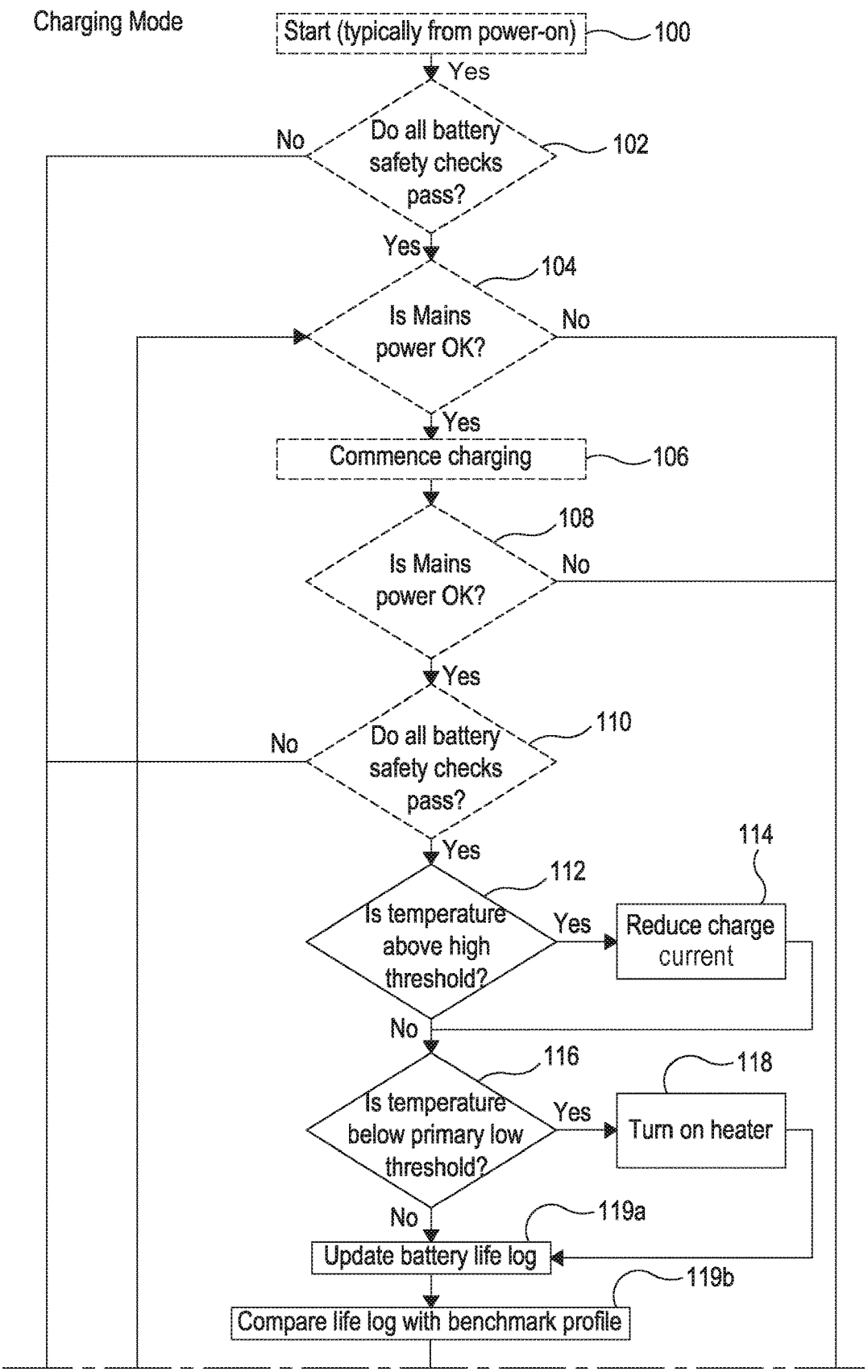
Figure 3:
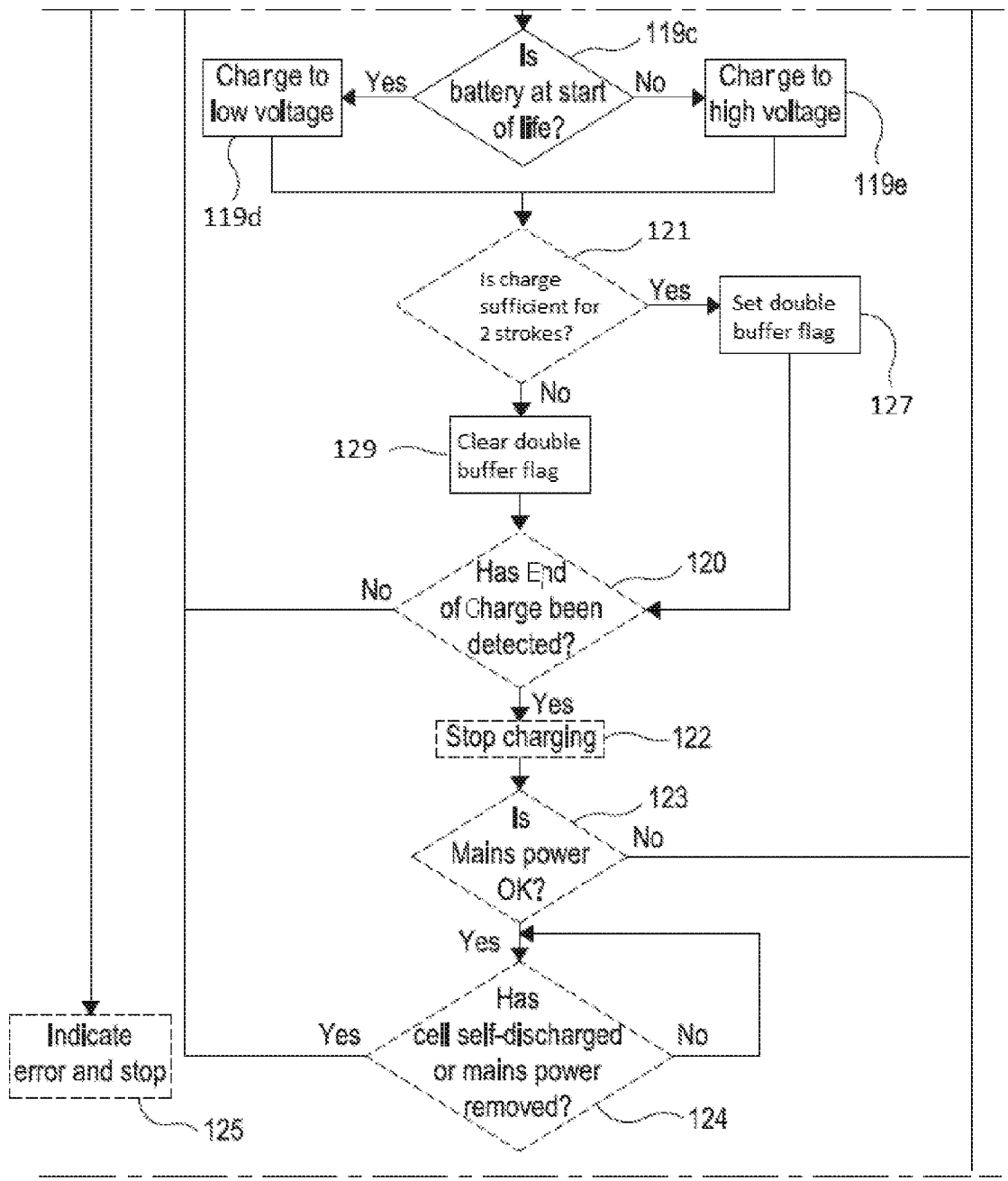
Figure 3:
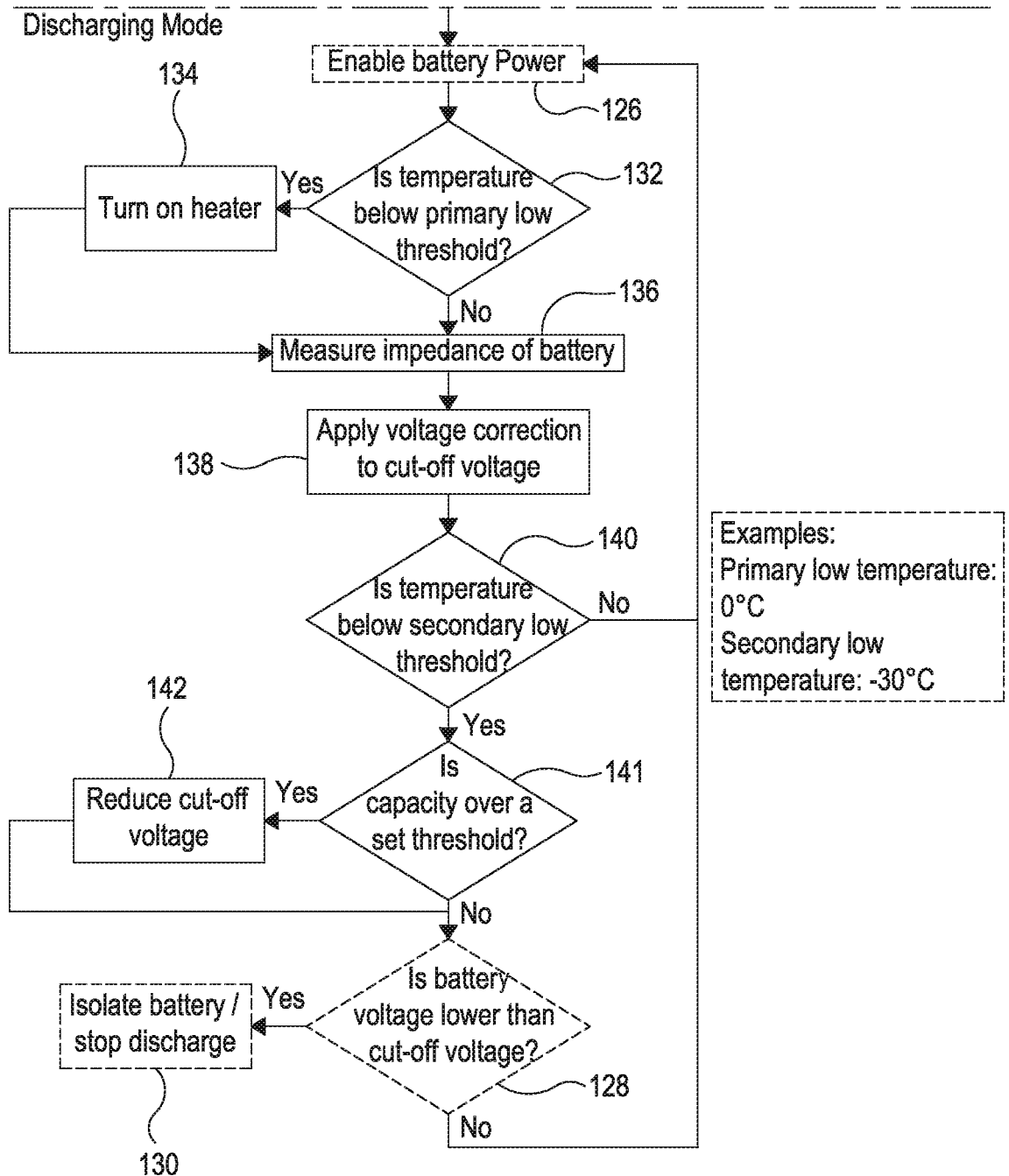

FIG. 3 shows a flow diagram for the battery management (or control) module, and method of battery management.

The battery management flow diagram starts at step 100, wherein the subsequent charging process flow can be triggered when the module is powered on, or after the battery pack has been in an idle state.

Once the process flow has started, the actuator control module checks the status (at step 102) of the battery pack for the following parameters:
Charge level;
Temperature;
Faults:
Under voltage;
Over voltage; and,
Over temperature; and,
Cell status and/or service/maintenance requirements.

The actuator control module selects an event and action mode of operation based on the current status of the mains power level, as well as whether or not the battery pack is safe to use, the actuator is safe to run, and the battery pack requires charging. Thus, at step 104, the actuator control module checks whether or not the mains power connected to the valve actuator is valid (i.e. sufficient to drive the motor, run the peripheral functions of the valve actuator and charge the battery pack (if required)).

If (or while) it is determined that the mains power present is valid, the battery is safe to use and is fully charged, and the actuator is safe to run, the valve actuator operates as a conventional motor-driven valve actuator, defined herein as normal events of operation, powered by the mains power present, and with the battery pack in an idle state (and configured to provide the required valve failsafe operation in the event of a respective command, power loss, and/or actuator fault).

If it is determined that the mains power present is not valid (i.e. not present or below a defined level), and/or a valid failsafe command is received, but the battery is safe to use, the actuator is safe to run and there is sufficient charge in the battery pack (that is, enough charge to complete at least two battery shutdown events), the actuator control module will cause a battery shutdown event. In this mode, the actuator moves to a predefined position or limit under battery power, either immediately or after a configurable waiting time.

If it is determined that the mains power present is valid (i.e. present and above a predefined level) and a valid shutdown command is received, the actuator control module will cause a mains shutdown event. In this mode, the actuator is moved to a predefined position or limit under mains power, with the battery acting as a standby (if mains power is deemed to be invalid, this can cause an automatic battery shutdown event), either immediately or after a preconfigured waiting time.

During a battery shutdown event, the valve actuator will, under power received from the battery pack:
move from any position to fully open limit, stopping on either load (i.e. torque and/or thrust) limit or position;
move from any position to fully closed limit stopping on either load limit or position; and/or,
move from any position to any other mid position.

When valid mains power is resumed, the actuator will re-enter normal operation (be this normal, battery actuation or self-contained), provided (or when) the battery pack is sufficiently charged to allow at least one further battery shutdown event.

If at step 104, it is determined that the mains power is valid (and, at step 102, it is determined that the battery is safe to use but requires charging), the actuator control module will, at step 106, commence charging of the battery pack. Within the battery charging process flow loop, the actuator control module once again checks the mains power at step 108, and also checks again whether or not all of the battery safety checks pass at step 110. If, the mains power remains normal and the battery safety checks all pass, the battery pack charging process flow moves to step 112.

At step 112, the actuator control module receives from a temperature sensor data representative of the temperature of and around the battery cells. It then compares the sensed temperature against a predetermined high threshold. If, compared to the predetermined high threshold, the battery pack temperature is determined to be too high, the actuator control module reduces the charge current to the battery pack at step 114. This part of the process is iterative, and may be repeated in steps, until the battery pack temperature is determined to be below the high threshold, and/or within a predetermined range.

Next, at step 116, the actuator control module compares the current battery pack temperature against a predetermined primary low threshold. If, compared to the predetermined primary low threshold, the battery pack temperature is determined to be too low, the actuator control module is configured to switch on the battery pack heater at step 118. Once again, this part of the process flow may be iterative, and repeated until the battery pack temperature is determined to be within the temperature range defined between the high threshold and the primary low threshold.

In accordance with embodiments of the invention, the charging regime may be adapted according to the age/degree of degradation of the battery pack. Thus, at step 119*a*, a battery life log is periodically updated. At step 119*b*, the control module compares the life log against a predetermined benchmark profile. If, at step 119*c*, it is determined that the battery pack is near the start of its lifespan, it is caused to charge at a predetermined low voltage (step 119*d*), whereas if it is determined not to be near the start of its lifespan, it is caused to charge at a predetermined high voltage (step 119*e*).

During charging of the battery pack, at step 121, the control module receives from a voltmeter and/or ammeter data representative of the measured charge level of the battery pack, such as a voltage measurement and/or a coulomb count measurement. The control module then compares these measurements with a first pre-determined charge threshold. The first charge threshold is the level of charge required to perform at least two battery shutdown events, for example moving the actuator at least twice to a failsafe position under battery power alone. That is, the battery pack is capable of performing at least two shutdown events under battery power alone. Where the actuator moves a valve, the failsafe position can be a normally open or a normally closed position of the valve.

If the measured charge level is equal to or greater than the first pre-determined charge threshold, the control module sets a system flag (referred to as a double buffer flag), which indicates the battery status to the rest of the system (step 127).

A first shutdown event typically occurs if the control module detects a loss of mains power. The system then switches from mains actuation, to battery powered actuation to perform a battery shutdown event. The battery shutdown event can involve moving the actuator into the failsafe position under battery power alone. When a double buffer flag is present, after the first shutdown event, the control module detects when mains power has been reinstated and is safe to use, and then restarts operations under the mains power. At this point, there will still be enough charge in the battery to complete at least one further battery shutdown event, should this be required (for example, further mains power interruption).

When operations resume under mains power, the battery can also begin simultaneously recharging using the mains power. The system does not need to wait until the battery is sufficiently recharged before resuming normal actuator operations. Normally, batteries can take tens of minutes or hours to recharge, and during this time actuator operation will typically be prevented. Having the capability to perform at least two shutdown events under battery power alone means that after a first shutdown event the battery pack does not need to wait to recharge before being ready to perform another shutdown operation. This helps to reduce operation downtime, which can in turn help to minimise any production and financial losses typically incurred during a downtime period.

Furthermore, since there will be enough charge in the battery to complete at least a second shutdown event when operations resume under mains power, simultaneous recharging of the battery can occur at a much slower/ leisurely rate. As mentioned previously, quickly re-charging the battery after a shutdown event is possible, but this comes at the expense of a shorter battery life and limitations on the useable temperature range of the battery. Moreover, if the battery pack is outwith an optimum temperature range, then the simultaneous recharging of the battery pack can be delayed until the battery pack is within the optimum temperature range. A slower charging rate, and also delaying charging until the battery pack is within an optimum temperature range, can help to preserve and extend the life of the battery, as well as allow operation at more extreme temperature ranges. As such, the actuator and battery pack of the present invention can be used in a much wider range of environments.

If at step 121, it is determined that there is insufficient battery charge to complete at least two shutdown events, any previous double buffer flags set by the control module are cleared (step 129). This tells the system that there is only enough charge for a single shutdown event, and if a battery shutdown event occurs, there will not be sufficient charge remaining in the battery to perform any further shutdown events.

The control module also compares the measured charge level with a second pre-determined charge threshold. The second charge threshold is the level of charge required to complete a single battery shutdown event under battery power alone. If the mains power is valid and determined to be safe to use, and the measured charge level is less than the second pre-determined charge level, such that the charge level of the battery pack is below that able to allow even a single battery shutdown event, the control module can be configured to decide whether to: resume normal actuator operations under the mains power, or prevent actuator operations until the battery has been recharged by the mains power to at least the first pre-determined level.

The charging and temperature detection/management process described above is repeated and continued until an end of charge signal is detected from the charging circuit at step 120. At that point, the actuator control module is configured to stop the battery pack from charging at step 122 and check, once again at step 123, if the mains power is normal. The process flow also checks at step 124 whether or not the battery pack has self-discharged and, if so, the process flow returns to step 106 and the actuator control module commences charging of the battery pack.

Thus, to summarise, once the status of the battery pack has been checked at step 102, if there are no faults on the battery pack (i.e. the battery pack is safe to use), the actuator control module will then decide the next step depending on the requirement as determined by the current mode of operation. If the battery pack requires charging, the actuator control module will switch in a constant current/constant voltage source to charge the battery pack as required. The voltage charge level is determined and controlled by the age of the battery cells, and the current level is determined by temperature and a user-set charge power.

Any faults detected within the battery pack can be reported to the user at step 125 via the actuator display or the actuator's own status relays or a network system (wired and/or wireless) connected to the actuator. In addition, the actuator control module can decide whether or not to continue to operate based on the above-mentioned sensed parameters and a pre-set user configuration.

During battery charging, and thereafter, the actuator will operate normally, without reference to the battery pack, unless:
 a) the battery reports a critical fault (in which case, the actuator control module exits the process flow and generates an error signal to be reported/displayed); or,
 b) valid mains power is removed; or a valid shutdown command is received and mains power is removed; or a valid shutdown command is received, mains power is present and the actuator is configured to move on battery in preference (in which case, the actuator control module will enter the shutdown mode of operation described above).

During charging, the battery management function of the actuator control module will monitor if the battery is safe to use and if the actuator is safe to run. If either of these checks fails, an error status will be flagged. The actuator control module also monitors if valid mains power is lost and/or if a valid shutdown command is received and, if either of these conditions is met, the actuator control module enters the shutdown mode described above.

Finally, charging will end when the battery reaches a predefined current limit at a predefined voltage level, causing an end of charge signal to be generated. The predefined voltage level can be varied depending on the age of the battery and ambient temperature. At this point, the battery management function checks the settled battery voltage and, if this is within the predetermined range, the battery pack will enter the above-mentioned idle state until it is determined that it requires charging. If this criterion is not met, the battery management function returns to step 106 and resumes the charging process.

Charging will end, as before, when the battery pack reaches a predefined voltage limit, which can be varied depending on the age of the battery. As before, at this point, the battery management function checks the settled battery voltage.

If this meets predetermined criteria, the battery pack will enter the above-mentioned idle state until it is determined that it requires charging. If the criteria are not met, the battery management function returns to step 106 and resumes the charging process.

Whenever the battery pack is enabled at step 126, either in a battery shutdown event or in a battery actuation event, the battery management function enters the discharging process flow. In this process flow, the actuator control module once again monitors the battery pack temperature, but in this case only compensates for low temperatures, i.e. below a primary low threshold (for example, 0° C.) and a secondary low threshold (for example, −30° C.). At step 132, the battery management function checks to determine if the temperature is below the primary low threshold. If it is, it causes the heater to be turned on at step 134. Next, it determines the cell impedance across the battery pack. If so, it isolates the battery pack and stops discharge at step 130. If not, the process flow returns to step 126 and the battery pack can continue to be utilized.

Of course, another significant advantage of the battery pack and associated active battery management process flow is the fact that the battery pack can be operated in a selected one of many operational modes, rather than the single passive shutdown or failsafe mode provided for in the above-described conventional valve actuators having an integral battery.

In the shutdown mode, the actuator operates as a normal, mains fed electric actuator until the mains power drops below a predetermined threshold and/or a valid shutdown command is received. This may be with or without a configurable time delay between the event and the shutdown action, as described above. The actuator will then make the decision, based on the mains power level and/or nature of the shutdown command to either commence a mains shutdown event or a battery shutdown event, which has been described previously.

In a battery actuation mode, the mains power (whether from the grid or from a renewable energy source) is used to run the peripheral systems of the actuator and charge the battery pack. When the valve is to be moved, the battery pack discharges to operate the actuator motor and is then recharged between movements. This will be described further as a battery actuation event. If so configured the actuator can commence a further battery shutdown event if the mains power drops below a predetermined threshold and/or a valid shutdown command is received. This may be with or without a configurable time delay between the event and the shutdown action as described above and with or without mains power present.

A self-contained mode, described below, is similar in many respects to the battery actuation mode, wherein additional hardware is provided to allow direct, optimised supply from a renewable energy source and allows additional peripheral items, such as sensors, to be connected. Power derived from, typically, a solar panel is used to run the peripheral systems of the actuator and charge the battery pack. This is referred to as a self-contained event. When the valve is to be moved, the battery pack discharges to operate the actuator motor and is then re-charged between movements. This will be described further as battery actuation. If so configured the actuator can further commence a battery shutdown event if the mains power drops below a predetermined threshold and/or a valid shutdown command is received and/or the battery becomes discharged to a predetermined level. This may be with or without a configurable time delay between the event and the shutdown action as described above.

These additional modes of operation will now be described in more detail.

In the battery actuation mode, the actuator control module is able to actuate the valve from an electrical supply less powerful than the power required to run the electro-mechanical actuator. The mains power (whether from the grid or a renewable energy source) is used to run the peripheral systems and charge the battery pack. When the valve is required to be moved, the battery pack discharges at step 126 to operate the actuator, described herein as a battery actuation event. In this mode of operation, a so-called deep sleep mode may be utilised (as described below) to maximise the charge going into the battery pack, with an automatic wake up signal being generated when the actuator motor is to be operated. If it is determined, at step 128, that the battery pack voltage is lower than a predefined cut-off voltage, the actuator control module isolates the battery at step 130 and an error is flagged.

To enable the battery actuation event, the battery management function, in the charging mode, will use the mains power available to charge the battery pack, and the battery pack is used to move the actuator in all cases. In this case, when the actuator wants to run, the actuator control module checks if:

a) there is sufficient battery charge;
b) the actuator has been brought out of deep sleep mode;
c) the battery is safe to use; and,
d) the actuator is safe to run.

If all these conditions are met the actuator will run from any set position to any other set position. A valid input will either be a digital signal, analogue level or network command.

If there is an error with either the battery or actuator, the error is reported and the actuator will decide if is serious enough to prevent operation. If there is insufficient battery charge this will prevent operation until sufficient charge is present.

In order to charge the battery pack, and whilst the battery pack is not being used to move the actuator, the process flow returns to steps 102 and 104. Provided sufficient mains power is present, the battery is safe to use, the actuator is safe to run and the battery requires charging, the actuator control module will commence charging the battery pack at step 106. During battery charging, and if so configured, the actuator enters a power saving (or deep sleep) mode and the battery pack is not used until a valid move command is received. The battery pack will be charged unless the battery reports a critical fault (in which case, an error status is flagged and the system will not run), valid mains power is removed (in which case, the system enters an above-described battery shutdown event) or a valid move command is received (in which case, the actuator will run from any set position to any other set position, as described above). These parameters are monitored throughout the charging process.

The above-described battery actuation mode can be utilised in a mains powered system, and/or in a system fed from a renewable energy source, for example solar, wind, and/or hydro. Thus, a so-called self-contained mode of operation is also envisaged, and this will now be described in more detail. The self-contained mode of operation is very similar to the battery actuation mode of operation, and the battery actuation and battery shutdown events are identical in operation. The key differences are the power source and the ability to make process decisions from a local sensor powered by the actuator and/or communicate information wirelessly back to a control centre for a move command to be wirelessly sent to the actuator in return.

In the self-contained mode of operation, the valve actuator can be powered using an inconsistent power supply derived from, for example, solar panels or wind generators. Power from these sources can be fed directly into the actuator, and can be used instead of a mains power supply in applications where an adequate mains power supply cannot be provided. The actuator control module manages the energy supply and stores energy in the battery pack. The power supply to the actuator runs the peripheral system and charges the battery when there is enough power present, the battery pack then powers the actuator motor and other systems when commanded and/or if there is insufficient power present. As described above, the battery management function can cause the battery to go into a so-called deep sleep mode so as to maximise the charge going to the battery, waking only on demand. As in all other modes, status can be reported visually, over wires or wirelessly, and in this case, the device may have the ability to be wired directly to third party sensors and process information based on user-set points.

The power source can be solar radiation through third party solar panels. The actuator will have the ability to control and optimise, through power point tracking, the output of the solar panels or other sources and feed the resulting electricity supply into the actuator battery pack. The principal benefit of this system is that the solar panel array does not need to be able to directly drive the actuator motor so will use the battery as an accumulator to drive the motor and bridge the gaps in sunlight caused by darkness or shadow. The method of operation shall be as per battery actuation mode.

In terms of functionality, in addition to the conventional hard wired commands and networks a valid signal will be received wirelessly. The actuator may reply with status information back over the same wireless communications. This allows a totally self-contained solution.

The final aspect of this is the attachment of external sensors, such as pressure sensors. This allows the actuator to make internal process decisions and vary its own set point either with or without reference to a central control set point. If the process moves outside of set parameters the actuator can send a warning message over the wired or wireless communications to the control.

In the event of a total loss of power, due to, for example, the failure of a solar panel, the actuator will move from any position to a pre-set set safe position and report an alarm, either wired or wirelessly in an as-described battery shutdown event.

It will be appreciated by a person skilled in the art, from the foregoing description, that modifications and variations can be made to the described embodiments without departing from the scope of the invention as defined by the appended claims.

The invention claimed is:

1. A motor driven actuator device comprising:
    an actuator motor;
    a controller;
    an input for receiving an external power supply; and,
    a battery pack electrically connected to selectively drive the actuator motor, and being electrically connectable to the external power supply for charging;
wherein, during charging of the battery pack, the controller is configured to:
    receive data representative of the measured charge level of the battery pack;
    compare the measured charge level with a pre-determined charge level required to complete at least two battery shutdown events, wherein a battery shutdown event involves moving the actuator device to a failsafe position under battery power alone; and,
    if the measured charge level is equal to or greater than the pre-determined charge level, indicate the battery status to other internal components associated with the actuator device; and, wherein, during operation of the actuator device, the controller is configured to:
    detect and determine the validity of the external power supply, and if the external power supply is determined to be invalid, instruct a battery shutdown event causing the battery to be discharged, such that there will still be enough charge in the battery to complete at least one further battery shutdown event; and,
    subsequently detect when the external power supply becomes valid, and resume actuator device operation under the external power supply, whilst simultaneously recharging the battery pack to at least the pre-determined charge level, so as to reduce downtime of the system and optimize charging time to lengthen battery life.

2. The actuator device as claimed in claim 1, wherein the controller is configured to prevent actuator device operation if the measured charge level is less than a second pre-determined charge level required to complete a single battery shutdown event under battery power alone.

3. The actuator device as claimed in claim 1, wherein the data representative of the measured battery charge level includes a measurement of the battery voltage or a coulomb count measurement of battery current integrated in time.

4. The actuator device as claimed in claim 1, wherein the controller is configured to:
receive data representative of a status of the external power supply;
receive data representative of a charge state or status of the battery pack; and,
cause the battery pack to be charged from the external power supply when the external power supply is determined to be valid and present and the battery pack requires charging.

5. The actuator device as claimed in claim 1, wherein the controller is further configured, during charging of the battery pack, to:
receive from at least one temperature sensor, data representative of a measured temperature associated with the battery pack;
compare the measured temperature with a first predetermined threshold temperature; and,
if the measured temperature is greater than the first predetermined threshold temperature, cause a charging current delivered from the external power supply to the battery pack to be reduced to prolong the life of the battery pack.

6. The actuator device as claimed in claim 5, wherein if the measured temperature is greater than the first predetermined temperature, the controller is configured to cause a charging current delivered from the external power supply to the battery pack to be reduced until the measured temperature is at or below the first predetermined threshold temperature.

7. The actuator device as claimed in claim 5, further comprising at least one heater associated with the battery pack; and, wherein the controller is further configured, during charging of the battery pack, to:
compare the measured temperature with a second predetermined threshold temperature; and,
if the measured temperature is less than the second predetermined threshold temperature, cause the at least one heater to be switched on until the measured temperature is at or above the second predetermined threshold temperature.

8. The actuator device as claimed in claim 1, further comprising an integral controller configured to:
control the selective driving of the actuator motor according to a defined control process; and,
receive, from a remote location, data configured to update or alter the control process.

9. The actuator device as claimed in claim 1, wherein the controller is configured to communicate a battery pack charge level, battery pack status or faults to a user; and wherein the battery pack charge level, battery pack status or faults are indicated to a user on a local display or conveyed digitally to a remote location via a network or via discrete signals for monitoring.

10. The actuator device as claimed in claim 1, wherein the controller is configurable to operate in a plurality of modes, events and actions of operation in addition to the battery shutdown event; and wherein the plurality of modes, events and actions of operation include battery actuation and self-contained modes; and mains shutdown, and battery actuation events.

11. The actuator device as claimed in claim 10, wherein in the battery actuation mode, the controller is configured to cause the external power supply to operate any ancillary systems of the actuator device, including causing the battery pack to be charged by the external power supply until it receives a move command; and wherein in response to the move command, the controller causes the actuator device to be moved under power from the battery pack, in the form of a battery actuation event, thus causing the battery pack to be discharged.

12. The actuator device as claimed in claim 10, wherein the controller is configured to prevent actuator device operation should the controller determine a fault condition in the battery pack.

13. A battery management system for a motor-driven actuator device comprising:
a battery manager;
an actuator motor;
an input for receiving an external power supply; and,
a battery pack electrically connected to selectively drive the actuator motor, and being electrically connectable to the external power supply for charging;
wherein, during charging of the battery pack, the battery manager is configured to:
receive data representative of the measured charge level of the battery pack;
compare the measured charge level with a pre-determined charge level required to complete at least two battery shutdown events under battery power alone, wherein a battery shutdown event involves moving the actuator device to a failsafe position; and,
if the measured charge level is equal to or greater than the pre-determined charge level, indicate the battery status to other internal components associated with the actuator device; and, wherein, during operation of the actuator device, the battery manager is configured to:
detect and determine the validity of the external power supply, and if the external power supply is determined to be invalid, instruct a battery shutdown event causing the battery to be discharged, such that there will still be enough charge in the battery to complete at least one further battery shutdown event; and,
subsequently detect when the external power supply becomes valid, and resume actuator device operation under the external power supply, whilst simultaneously recharging the battery pack to at least the pre-determined charge level.

14. The battery management system as claimed in claim 13, wherein the battery manager is configured to prevent actuator device operation if the measured charge level is less than a second pre-determined charge level required to complete a single battery shutdown event under battery power alone.

15. The battery management system as claimed in either claim 13, wherein the data representative of the measured battery charge level includes voltage or coulomb count measurements.

16. The battery management system as claimed in claim 13, wherein the battery manager is further configured to:
- receive data representative of a status of the external power supply;
- receive data representative of a charge state or status of the battery pack; and,
- cause the battery pack to be charged from the external power supply when an external power supply is determined to be valid, present and the battery pack requires charging.

17. The battery management system as claimed in claim 13, wherein the battery manager is further configured, during charging of the battery pack, to:
- receive from at least one temperature sensor, data representative of a measured temperature associated with the battery pack;
- compare the measured temperature with a first predetermined threshold temperature; and,
- if the measured temperature is greater than the first predetermined threshold temperature, cause a charging current delivered from the external power supply to the battery pack to be reduced to prolong the life of the battery pack.

18. The battery management system as claimed in claim 13, wherein the battery manager is configurable to operate in a selected one of a plurality of modes, events and actions of operation, in addition to a battery shutdown event; and wherein the plurality of modes, events and actions of operation include battery actuation and self-contained modes; and mains shutdown, and battery actuation events.

19. The battery management system as claimed in claim 13, wherein during charging of the battery pack, the battery manager is configured to receive data representative of a measured life and cell impedance of the battery pack, compare the data with a predetermined profile of performance, and if the measured cell impedance is greater than the predetermined profile, cause the charge voltage thereto to be reduced.

20. The battery management system as claimed in claim 13, wherein during discharge of the battery pack, the battery manager is configured to receive data representative of a measured temperature associated with the battery pack, compare the measured temperature with a predetermined threshold temperature and, if the measured temperature is less than the predetermined threshold temperature, cause a lower limit for discharge voltage to be reduced.

21. The battery management system according to claim 13, wherein, during discharge of the battery pack, the battery manager is configured to receive data representative of a measured temperature associated with the battery pack, compare the measured temperature with a predetermined second threshold temperature and, if the measured temperature is less than the predetermined temperature, cause a heating device associated with a the battery pack to be switched on.

22. The battery management system as claimed in claim 13, wherein the battery manager is configured to detect and determine the validity of the external power supply and:
(i) if the external power supply is valid and a valid shutdown command has been received, cause an external power supply powered shutdown event to be effected; and,
(ii) if the external power supply is not valid or determined to become invalid, or a valid shutdown command has been received or a mains shutdown event is underway, switch from the external power supply powered shutdown event to a battery shutdown event causing the battery to be discharged, such that there will still be enough charge in the battery to complete at least one further battery shutdown event.

23. The battery management system as claimed in claim 13, wherein the battery manager is configured to enable the motor-driven actuator device to operate normally, with the battery pack in either an idle or charge state unless the external power supply is determined to be invalid or a valid shutdown command is received, such that an external power supply powered shutdown event or a battery shutdown event is effected accordingly.

* * * * *